US012515108B2

(12) United States Patent
Haugom et al.

(10) Patent No.: US 12,515,108 B2
(45) Date of Patent: Jan. 6, 2026

(54) PICKLEBALL BALL

(71) Applicant: HUMMINGBIRD SPORT LIMITED PARTNERSHIP, Vancouver (CA)

(72) Inventors: Howard Haugom, Victoria (CA); Fang Xie, Vancouver (CA); Jordan Willem Mikkers, Victoria (CA); Eric Matt Little, Vancouver (CA)

(73) Assignee: HUMMINGBIRD SPORT LIMITED PARTNERSHIP, Vancouver (CA)

( * ) Notice: Subject to any disclaimer, the term of this patent is extended or adjusted under 35 U.S.C. 154(b) by 0 days.

(21) Appl. No.: 18/788,042

(22) Filed: Jul. 29, 2024

(65) Prior Publication Data

US 2025/0121257 A1    Apr. 17, 2025

Related U.S. Application Data

(60) Provisional application No. 63/590,157, filed on Oct. 13, 2023.

(51) Int. Cl.
*A63B 37/00* (2006.01)
*A63B 102/08* (2015.01)
*B29C 41/04* (2006.01)
*B29K 23/00* (2006.01)
(Continued)

(52) U.S. Cl.
CPC .......... *A63B 37/0098* (2013.01); *B29C 41/04* (2013.01); *A63B 2102/08* (2015.10); *A63B 2209/00* (2013.01); *B29K 2023/0633* (2013.01); *B29K 2023/065* (2013.01); *B29K 2023/14* (2013.01); *B29K 2307/04* (2013.01);
(Continued)

(58) Field of Classification Search
CPC ................ A63B 37/0098; A63B 39/00; A63B 2039/003; B29L 2031/54
USPC ......................................... 473/569, 612, 613
See application file for complete search history.

(56) References Cited

U.S. PATENT DOCUMENTS 1,483,165 A * 2/1924 Washington ....... A63B 69/3655
D30/160
2,929,632 A * 3/1960 Moffatt .............. A63B 69/0079
473/143
(Continued)

FOREIGN PATENT DOCUMENTS

CA         213667       5/2023
CN       304554522      3/2018
(Continued)

OTHER PUBLICATIONS

Peake, M.J., et al. The equal spacing of N points on a sphere with application to partition-of-unity wave diffraction problems, Engineering Analysis with Boundary Elements, Nov. 15, 2013, pp. 1-26.
(Continued)

*Primary Examiner* — Joseph B Baldori
(74) *Attorney, Agent, or Firm* — Norton Rose Fulbright Canada LLP

(57) ABSTRACT

A pickleball ball is provided for increasing durability, improving performance, and/or reducing the loudness and/or frequency of sound generated when said ball strikes a paddle. The ball being a hollow ball comprised of a spherical shell defining a hollow cavity. The ball is made of a graphene-infused polymer material and the shell defines a plurality of holes distributed around the surface of the ball.

13 Claims, 8 Drawing Sheets

(51) Int. Cl.
   *B29K 307/04*      (2006.01)
   *B29L 31/54*       (2006.01)
(52) U.S. Cl.
   CPC .. *B29K 2995/002* (2013.01); *B29K 2995/007* (2013.01); *B29L 2031/54* (2013.01)

(56) References Cited

U.S. PATENT DOCUMENTS

| | | | | |
|---|---|---|---|---|
| 2,961,241 | A * | 11/1960 | Borg | A63B 69/0079 |
| | | | | 473/147 |
| 3,908,994 | A * | 9/1975 | Astrom | A63B 43/00 |
| | | | | 473/613 |
| 4,186,921 | A * | 2/1980 | Fox | A63B 69/0088 |
| | | | | 29/463 |
| 4,930,776 | A * | 6/1990 | Newcomb | A63B 43/06 |
| | | | | 273/DIG. 20 |
| 5,211,612 | A * | 5/1993 | Carbonero | A63B 43/007 |
| | | | | 473/576 |
| 5,280,906 | A * | 1/1994 | Vitale | A63B 43/00 |
| | | | | 273/DIG. 20 |
| 5,700,211 | A * | 12/1997 | Mackie | A63B 43/00 |
| | | | | 473/613 |
| 6,012,997 | A * | 1/2000 | Mason | A63B 43/00 |
| | | | | 273/DIG. 20 |
| D459,404 | S | 6/2002 | Perez | |
| D514,263 | S * | 1/2006 | Willinger | D21/713 |
| 7,608,003 | B1 * | 10/2009 | Fusco | A63B 43/00 |
| | | | | 473/613 |
| 8,357,062 | B2 | 1/2013 | Lim et al. | |
| 8,877,110 | B2 * | 11/2014 | Molinari | A63B 37/0003 |
| | | | | 264/267 |
| 9,592,426 | B1 | 3/2017 | DiPietro | |
| D799,613 | S | 10/2017 | Dillon | |
| D800,236 | S | 10/2017 | Dillon | |
| 10,086,237 | B1 * | 10/2018 | Chavan | A63B 37/0031 |
| 10,456,629 | B1 * | 10/2019 | Chavan | A63B 37/0023 |
| 10,500,445 | B1 * | 12/2019 | Chavan | A63B 37/0033 |
| 10,722,755 | B1 * | 7/2020 | Chavan | A63B 37/00222 |
| 11,491,374 | B1 * | 11/2022 | Newcomb | A63B 43/06 |
| 11,679,306 | B1 | 6/2023 | Newcomb | |
| D996,540 | S | 8/2023 | Kowalski | |
| D1,009,191 | S | 12/2023 | Kowalski | |
| 11,918,862 | B1 * | 3/2024 | Fox | A63B 47/001 |
| 12,070,658 | B2 * | 8/2024 | Fox | A63B 47/001 |
| 2003/0176228 | A1 * | 9/2003 | Santa Cruz | A63B 69/3617 |
| | | | | 473/588 |
| 2008/0099994 | A1 * | 5/2008 | Tuttle | A63F 7/00 |
| | | | | 273/280 |
| 2008/0287218 | A1 * | 11/2008 | Freund | A63B 69/00 |
| | | | | 473/377 |
| 2009/0137350 | A1 * | 5/2009 | Lenig | A63B 39/00 |
| | | | | 434/247 |
| 2013/0040767 | A1 * | 2/2013 | Gill | A63B 59/50 |
| | | | | 473/570 |
| 2013/0296085 | A1 * | 11/2013 | Parenti | A63B 39/00 |
| | | | | 473/611 |
| 2014/0066235 | A1 * | 3/2014 | Hill | A63B 59/48 |
| | | | | 473/528 |
| 2014/0274465 | A1 * | 9/2014 | Francis | A63B 39/00 |
| | | | | 473/613 |
| 2015/0343270 | A1 * | 12/2015 | DuFaux | A63B 37/0075 |
| | | | | 473/373 |
| 2017/0354850 | A1 * | 12/2017 | Chen | A63B 43/00 |
| 2018/0207490 | A1 * | 7/2018 | Hong | A63B 37/0075 |
| 2018/0264325 | A1 * | 9/2018 | Bulpett | A63B 37/0063 |
| 2022/0032141 | A1 * | 2/2022 | Brents | A63B 60/54 |
| 2023/0201672 | A1 | 6/2023 | You | |
| 2023/0293950 | A1 * | 9/2023 | Fox | A63B 47/001 |
| | | | | 2/265 |
| 2024/0189668 | A1 * | 6/2024 | Franceschelli | A63B 45/00 |
| 2024/0367009 | A1 * | 11/2024 | Moonen | B29C 64/124 |
| 2024/0390753 | A1 * | 11/2024 | Haugom | A63B 59/42 |

FOREIGN PATENT DOCUMENTS

| | | |
|---|---|---|
| CN | 308233416 | 9/2023 |
| EP | 4467208 A2 | 11/2024 |
| JP | D1728909 | 11/2022 |
| TW | 222595-0001 | 12/2022 |
| TW | 223675-0001 | 2/2023 |
| WO | 2017007977 A1 | 1/2017 |
| WO | D221229-001 | 6/2022 |
| WO | 2024076417 A1 | 4/2024 |

OTHER PUBLICATIONS

Written Opinion and International Search Report of International Application No. PCT/CA2024/051343 dated Jan. 2, 2025.

* cited by examiner

PICKLEBALL BALL

CROSS-REFERENCE TO RELATED APPLICATIONS

This application claims the benefit of U.S. Provisional Application No. 63/590,157 filed on Oct. 13, 2023 titled "Noise Controlled Ball", the entire content of which is incorporated herein by reference.

FIELD

The present disclosure generally relates to the field of sport equipment, and in particular pickleball paddles and balls with improved noise control, durability, and/or performance.

BACKGROUND

Pickleball is an indoor or outdoor racket or paddle sport where two or four players hit a perforated hollow plastic ball over a net using solid-faced paddles. Pickleball has become one of the fastest-growing sports in North America and various national and international Pickleball organizations and foundations have been established to organize and regulate the sport.

Amidst the growing popularity however, the sport has also attracted petitions and lawsuits due to noise complaint. The noise generated from impact between ball and paddle can be significantly louder than tennis or other racket sports. In addition, elbow pain has been a serious concern for pickleball players. A large percentage of pickleball players are often playing while wounded, wrapped up in braces or bands, or even dropping out of matches due to elbow pain. One theory regarding the elbow pain experience by players is that the vibrations involved in hitting a hard, plastic pickleball with the paddle used in the game are considerably more intense than the vibrations involved in hitting a tennis ball with a tennis racket.

As a result, there is a need for improved pickleball equipment that reduces noise and dampens vibration without compromising play. Embodiments described herein relate to improved pickleball balls with enhanced noise control, durability and/or performance.

SUMMARY

Embodiments described herein provide a pickleball ball for increasing durability, improving performance, and/or reducing the loudness and/or frequency of sound generated when said ball strikes a paddle. In an aspect, there is provided a pickleball ball with increased noise control, durability and/or performance, the pickleball ball being a hollow ball made of a graphene-infused polymer material. The ball is a hollow ball comprising a spherical shell defining a hollow cavity. The shell defines a plurality of holes. The shell defines a plurality of holes such that the holes are distributed around its surface. The shell defines the holes to pass into the hollow cavity. In an aspect, the ball is a hollow ball with a spherical shell or layer providing a surface of the ball. The ball defines a plurality of holes distributed around its surface. In another aspect, the ball is a hollow ball comprising a shell defining a hollow cavity. The shell defines a plurality of holes over the surface of the ball. In an aspect, the shell or sphere layer defines holes that are equally (or about equally or approximately equally in view of a threshold variation) distributed arounds the surface of the ball. That is, the shell defines holes that are equally distributed such that there is an equal distance (or about equal or approximately equal in view of a threshold variation or tolerance threshold) between adjacent or neighboring holes. In an aspect, the shell or sphere layer defines holes that are of equal size and shape (or about equal or approximately equal in view of a threshold variation or tolerance threshold). In another aspect, the ball is made of a graphene-infused polymer material.

In one embodiment, the material is a graphene-infused plastic. In one embodiment, the material is a graphene-infused co-polymer. In one embodiment, the co-polymer comprises plypropylene (PP) and polyethylene (PE). In one embodiment, the co-polymer comprises PP and high density polyethylene (HDPE). In one embodiment, the co-polymer comprises 50/50 HDPE and PP by weight. In one embodiment, the material is a graphene-infused polyethylene (PE). In one embodiment, the polyethylene is low-density polyethylene (LDPE). In one embodiment, the LDPE has a Shore D hardness value of about 50-55. In one embodiment, the ball comprises at least 0.01% by weight graphene and the rest plastic. In one embodiment, the ball comprises about 0.01%-0.05% by weight graphene and the rest plastic. In one embodiment, the ball comprises about 0.02% by weight graphene and the rest plastic. In one embodiment, the ball comprises about 0.03% by weight graphene and the rest plastic. In one embodiment, the graphene is white graphene powder. In one embodiment, the shell defines the plurality of holes arranged symmetrically on its surface. In one embodiment, the shell defines 32 or 40 holes. In one embodiment, the ball has a color with sensitivity for human eye. In one embodiment, the ball has a neon green color, a neon orange color, a dark yellow color, or a Pantone 802 color. In one embodiment, the holes have substantially the same size and shape.

In one aspect, there in provided a pickleball ball, the ball being a hollow ball comprising a spherical shell defining a hollow cavity, the shell defining a plurality of holes arranged on its surface according to a hole pattern of evenly spaced holes to provide a symmetric arrangement of holes. In one embodiment, the shell defines the holes in the hole pattern with distances therebetween, wherein any two adjacent holes in the hole pattern having an equal distance therebetween within a tolerance threshold. In one embodiment, the ball has 40 holes and wherein the tolerance threshold is at most 4 mm. In one embodiment, the shell defines the holes having a same or substantially similar shape and size.

In one aspect, a pickleball ball for increasing durability and/or reducing the loudness and/or frequency of sound generated when the pickleball ball strikes a pickleball paddle, the pickleball ball having a symmetrical arrangement of holes distributed around its surface, wherein the shell defines the holes such that any two adjacent holes are spaced by an equal distance within a tolerance threshold. In one embodiment, the ball as at least 80%, more preferably at least 90% symmetry, in the arrangement of holes. In one embodiment, the ball has at least 95% symmetry.

In one aspect, a method for making a ball is provided, the method comprising: preparing formula comprising a blend of polymers and graphene, providing a colour for the ball with sensitivity for human eye, generating a hole pattern for a shell of the ball with evenly spaced holes, and making a plurality of holes in the shell arranged symmetrically on its surface according to the hole pattern. In one embodiment, the method comprises rotomolding the ball. In one embodiment, the method comprises injection molding or 3D printing the ball.

In another aspect, there is provided a pickleball ball for reducing the loudness and/or frequency of sound generated when said pickleball ball strikes a pickleball paddle.

In another aspect, there is provided a pickleball ball having a color configured for higher sensitivity for human eye.

In another aspect, there is provided a pickleball ball having 26-40 holes with substantially the same diameter and shape, the holes are distributed symmetrically about the pickleball ball.

In yet another aspect, there is provided a pickleball ball having holes with substantially the same diameter and shape arranged symmetrically about the pickleball ball, and wherein the pickleball ball is made of a graphene-infused polymer material.

DESCRIPTION OF THE FIGURES

Embodiments of devices, apparatus, methods, and kits are described throughout reference to the drawings.

DETAILED DESCRIPTION

Figure 1:
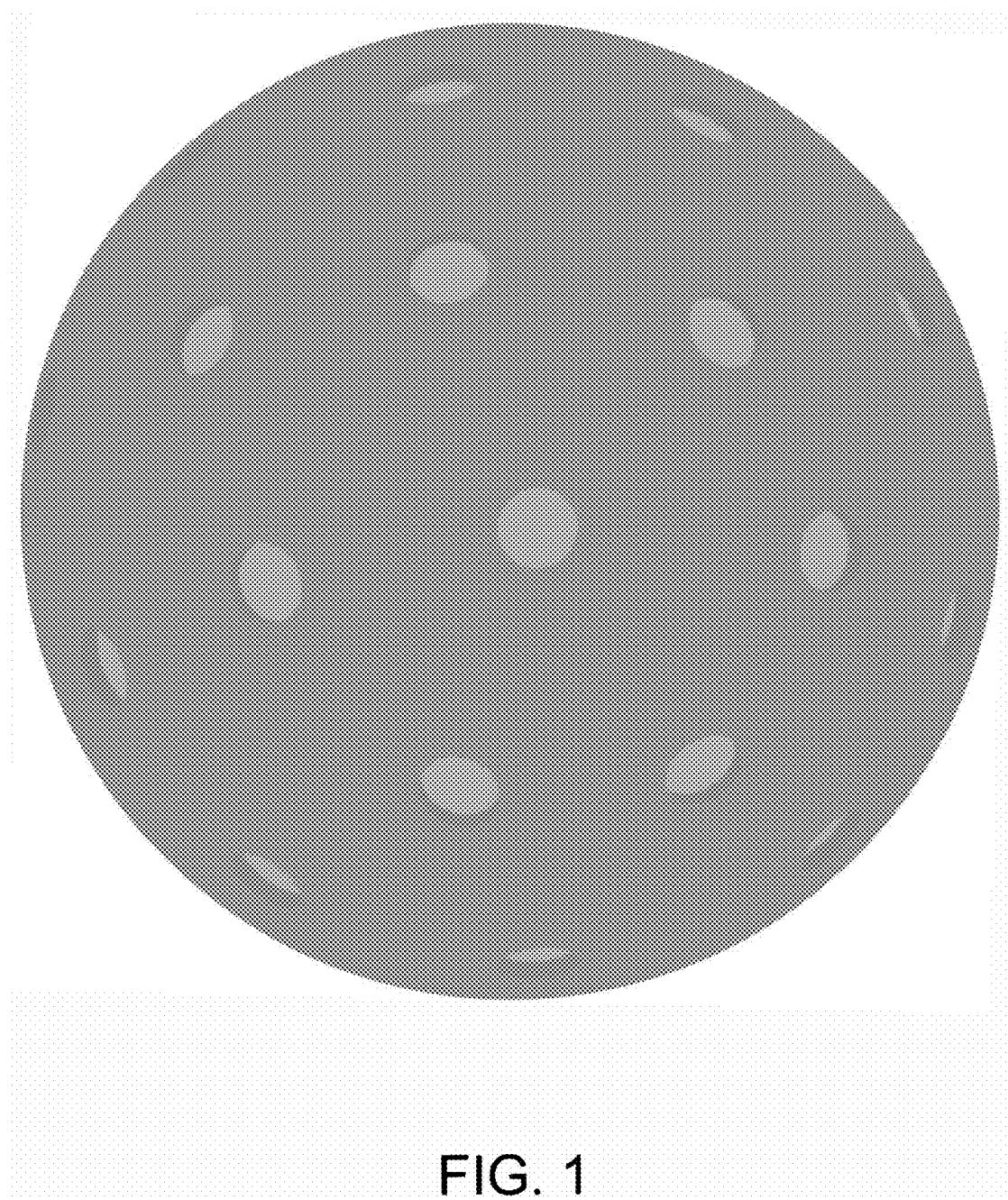
FIG. 1 shows a perspective view of an embodiment of a pickleball ball according to the present disclosure.
Figure 2:
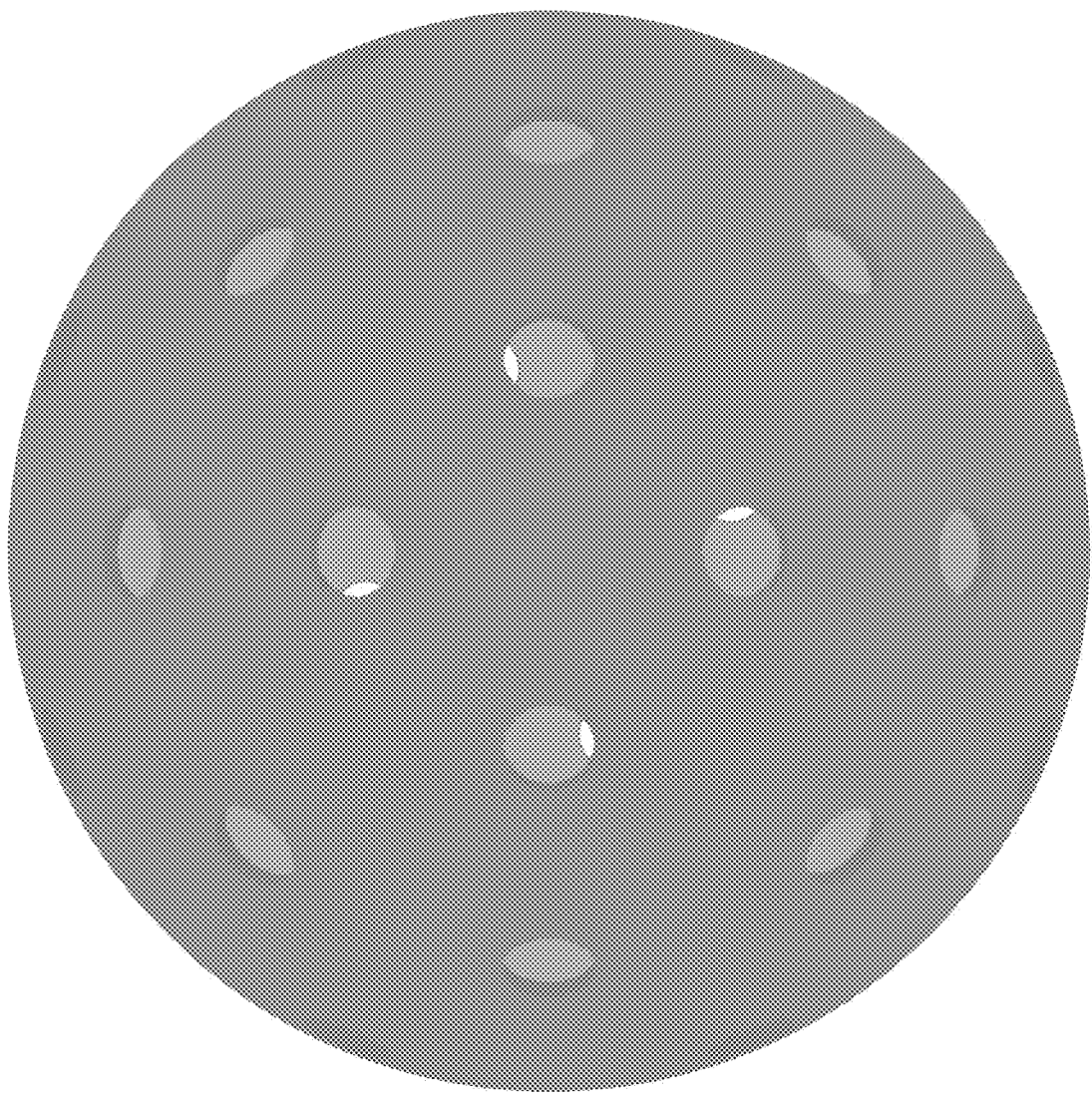
FIG. 2 shows a front view of the pickleball ball of FIG. 1.
Figure 3:
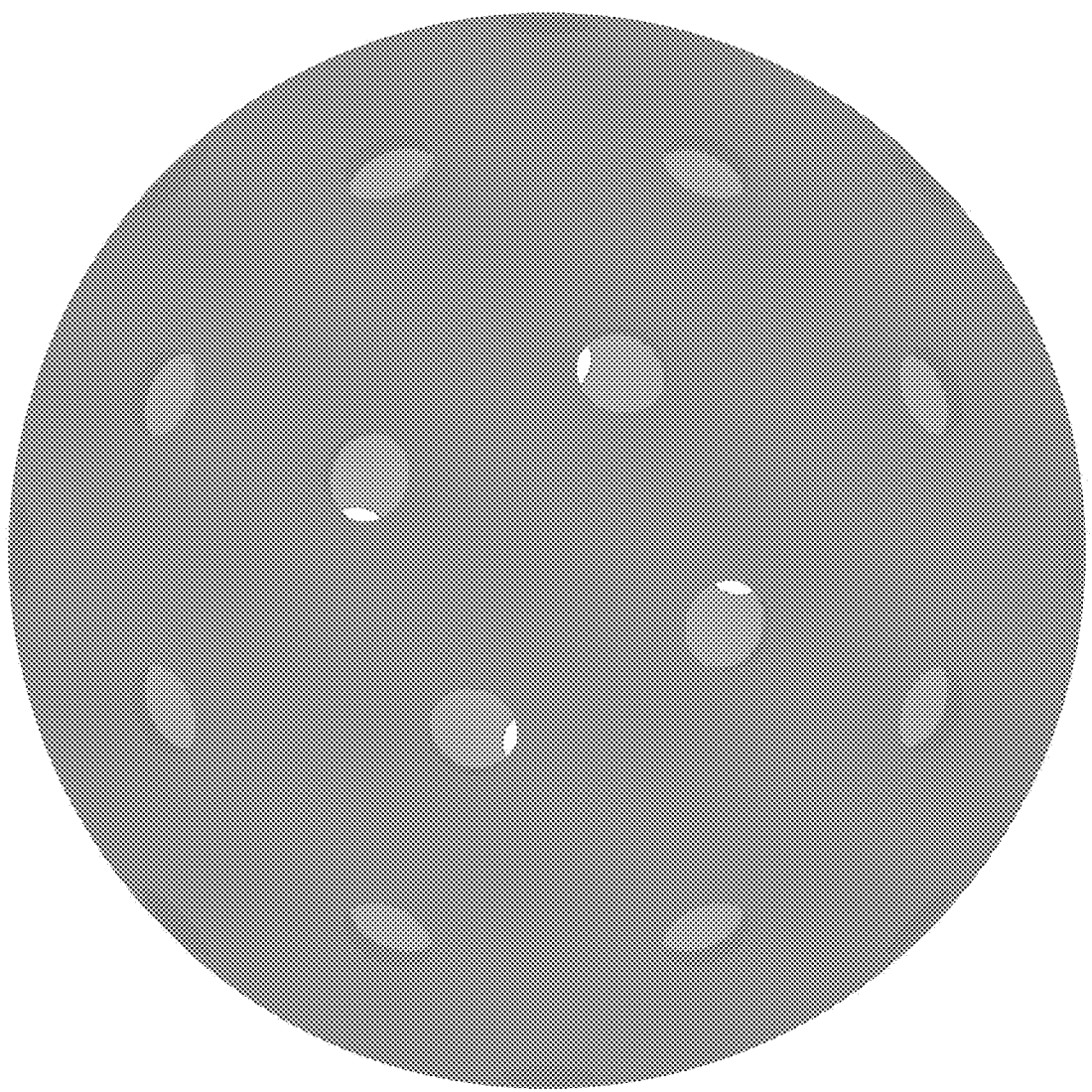
FIG. 3 shows a back view of the pickleball ball of FIG. 1.
Figure 4:
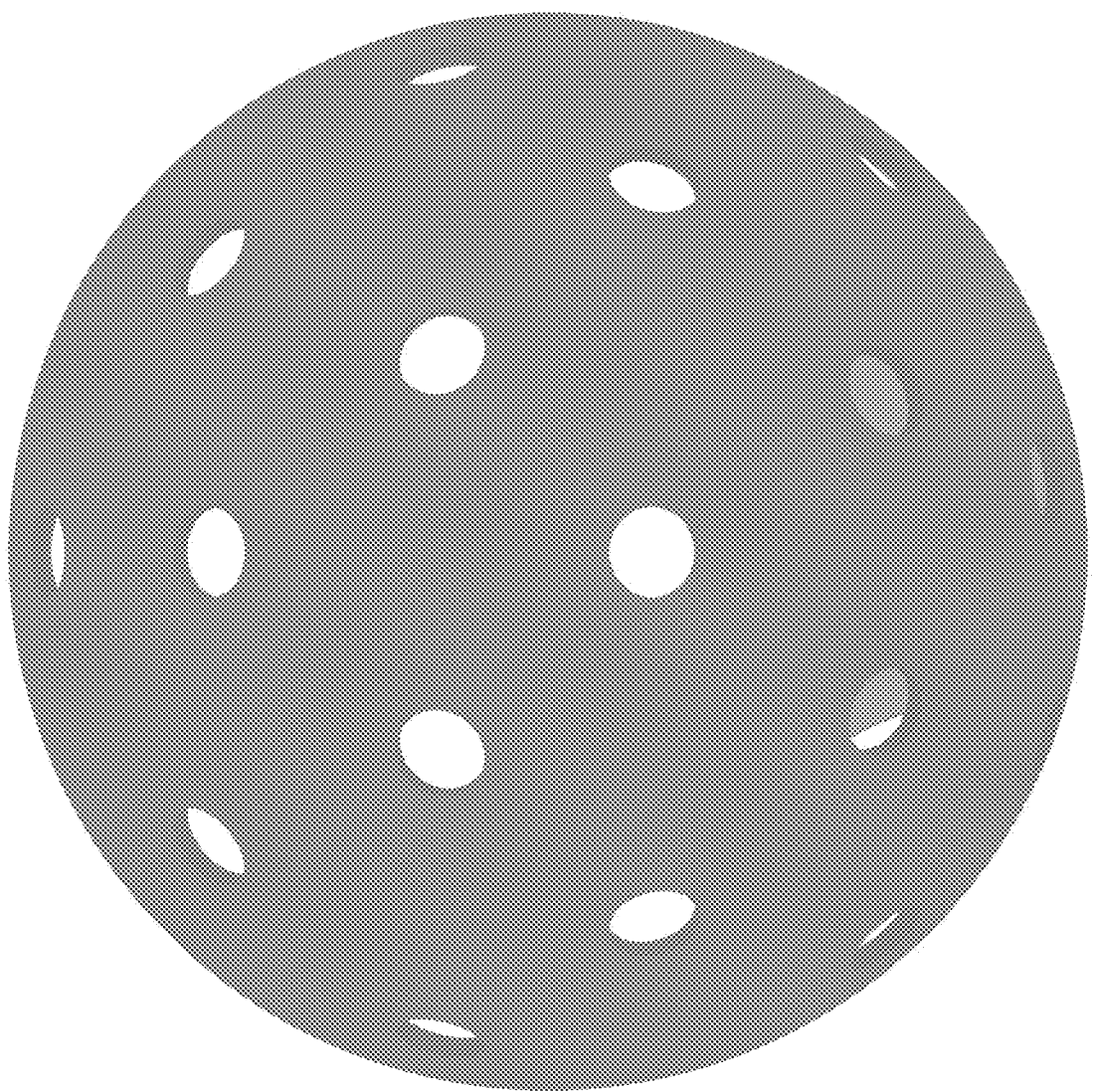
FIG. 4 shows a right view of the pickleball ball of FIG. 1.
Figure 5:
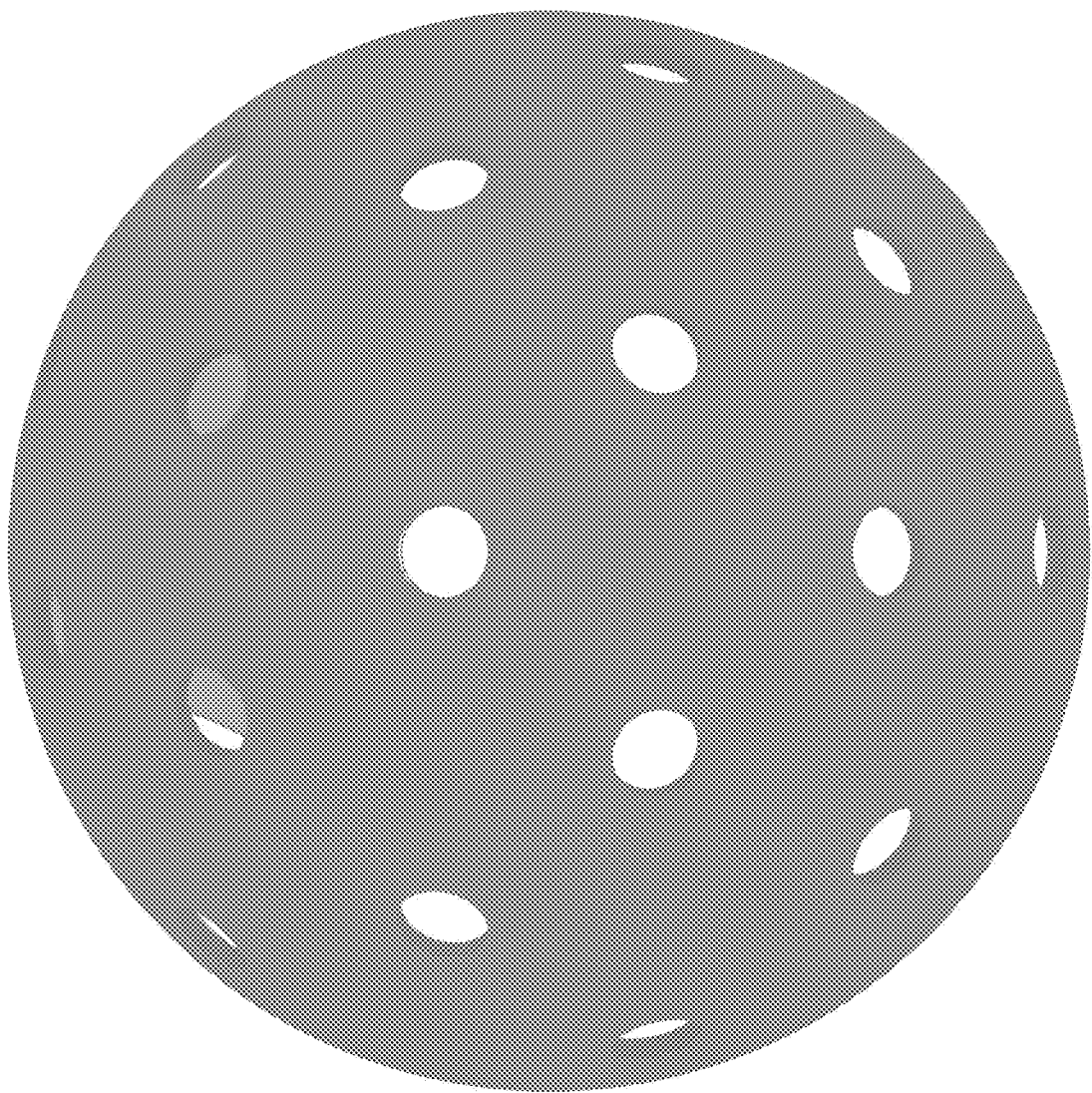
FIG. 5 shows a left view of the pickleball ball of FIG. 1.
Figure 6:
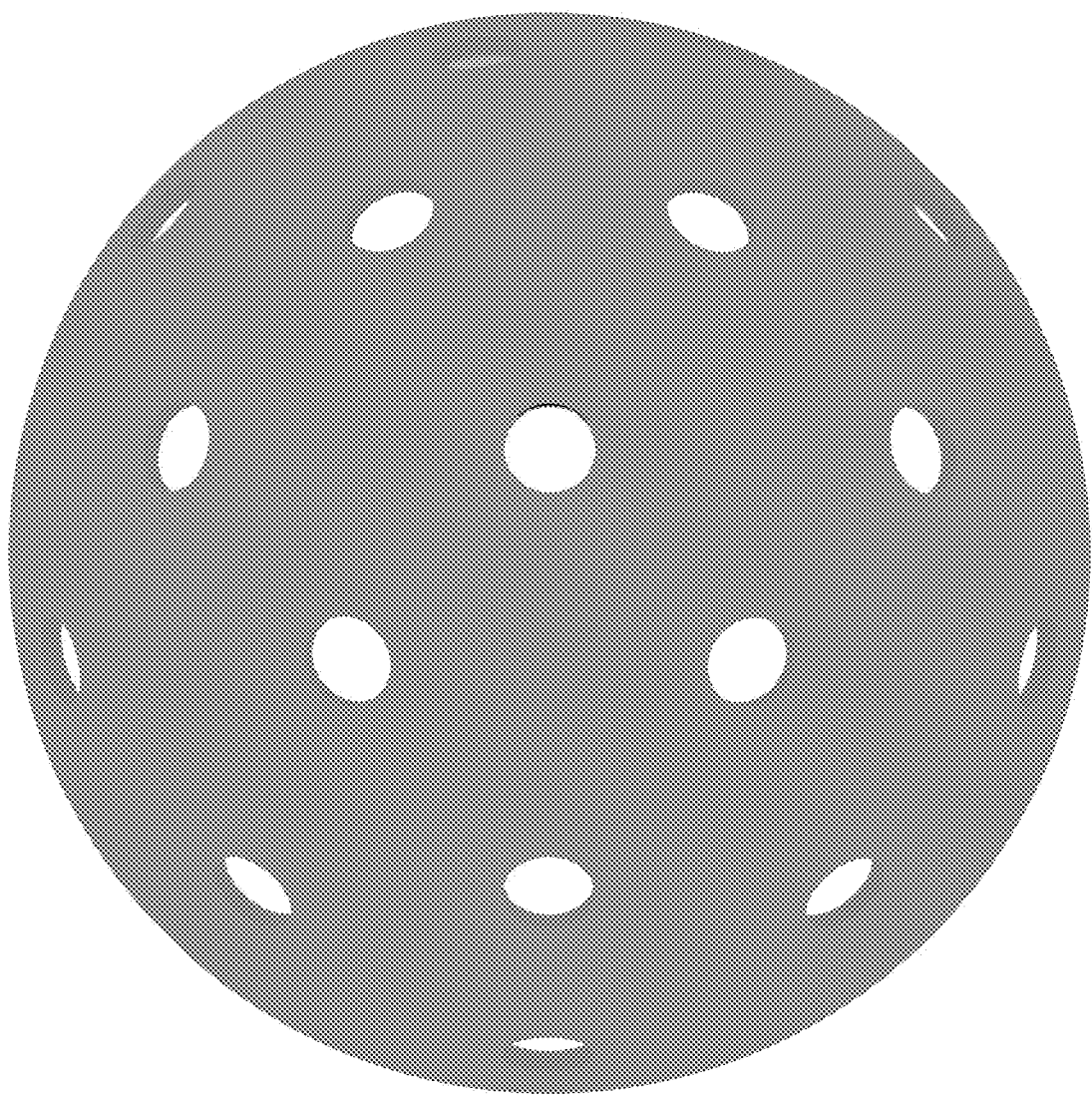
FIG. 6 shows a top view of the pickleball ball of FIG. 1.
Figure 7:
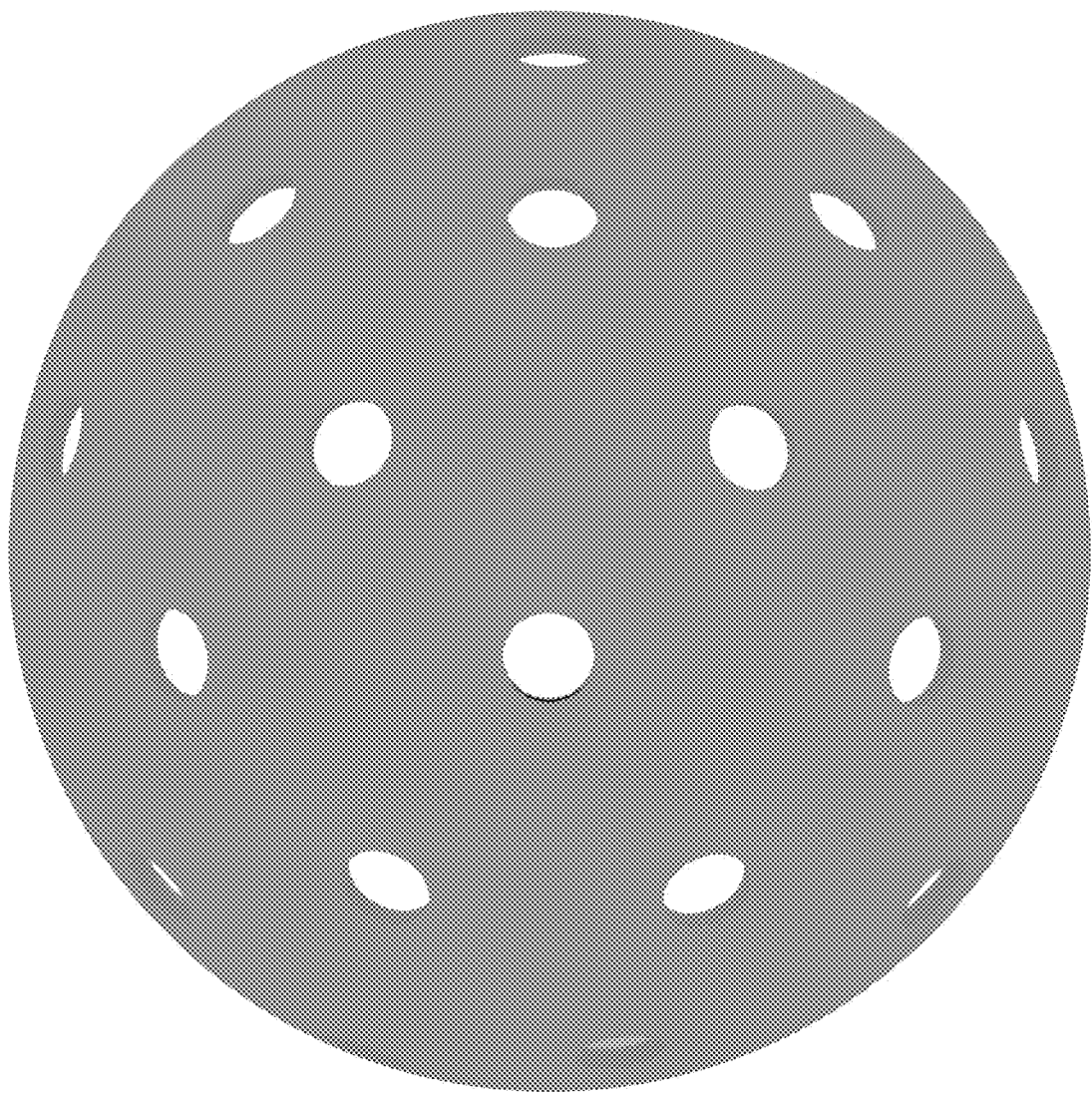
FIG. 7 shows a bottom view of the pickleball ball of FIG. 1.

Numerous details are set forth to provide an understanding of the examples described herein. The examples may be practiced without these details. The description is not to be considered as limited to the scope of the examples described herein.

Pickleball balls are made of hollow plastic balls having a number of holes. The ball is a sphere. Embodiments described herein provide a pickleball ball for increasing durability, improving performance, and/or reducing the loudness and/or frequency of sound generated when said ball strikes a paddle. Embodiments described herein provide a pickleball ball made of a graphene-infused polymer material. The ball has a spherical shape. The ball has a spherical shell or layer defining a hollow cavity. The shell or layer (e.g. providing the hollow cavity of the ball) defines a plurality of holes distributed around the surface of the ball. The ball is a hollow ball with a sphere layer that can provide a surface of the ball. The spherical layer defines a plurality of holes and distributes that holes over the surface of the ball. In some embodiments, the spherical shell or layer defines holes that are equally (or about equally or approximately equally in view of a threshold variation or tolerance threshold) distributed across the surface of the ball. That is, the shell defines holes that are equally distributed such that there is an equal distance (or about equal or approximately equal in view of a threshold variation or tolerance threshold) between adjacent or neighboring holes. There can be an equal distance (or about equal or approximately equal) between the adjacent or neighboring holes subject to a threshold variation or tolerance threshold in distance. In an aspect, the spherical shell or layer defines holes that are of equal size and shape (or about equal or approximately equal in view of a threshold variation). In another aspect, the ball is made of a graphene-infused polymer material. Embodiments described herein provide a hollow ball comprising a spherical shell defining a hollow cavity. The shell defines a plurality of holes distributed around the surface of the ball. The shell defines the holes into the hollow cavity.

As used herein, a hollow ball comprises a spherical shell or layer encapsulating an interior spherical space therein. That is, the ball can be a sphere shape with a spherical shell or layer that defines a hollow cavity that provides a spherical space within the ball. A hollow ball is a ball with a hollow inside or hollow cavity. A hollow ball defines a space or cavity inside, and is not solid. For continuous hollow balls without holes, the spherical shell separates the interior spherical space from the exterior environment. The shell can define the interior space as a hollow cavity. For hollow balls with holes, the shell or layer has holes that connect the interior spherical space to the exterior environment. That is, the shell defines holes that pass into the hollow cavity of the ball. In preferred embodiments, a spherical shell comprises a layer of material with generally even thickness. The spherical shell is a region between two concentric spheres of differing radii. The region of the shell can have generally even thickness. The spherical shell defines a layer or a surface. In one embodiment, the surface comprises an exterior or outer surface of the ball that trikes a racket. In one embodiment, the surface comprises a spherical shell of material. Holes distributed on the surface of a ball extends through the spherical shell connecting the interior spherical space to the exterior environment.

Pickleball balls may also be made from plastic, resin, and/or polymer. There are different types of pickleball balls, such as indoor and outdoor balls. Indoor balls tend to be slightly lighter and made of softer or thinner plastic than an outdoor ball. In addition, the holes in the indoor balls have wider diameters, providing a softer ball feel and slower movement of the ball for easier control. On the other hand, outdoor balls are harder and have smaller holes, which lead to the ball bouncing off the paddle faster and harder than indoor balls and the outdoor balls are also less affected by wind. Since outdoor balls are also often made from thicker plastic, this helps with durability.

As such, key factors for pickleball ball design include: weight, size, thickness, stiffness, number and size of holes. Currently approved pickleball balls for competition require a diameter that is between 2.874 inches (7.30 cm) and 2.972 inches (7.55 cm), or a circumference that is between 9.03 inches (22.93 cm) and 9.34 inches (23.72 cm), along with the weight falling in between 0.78-0.935 ounces. In addition, pickleball balls should also have between 26 and 40 holes that are spaced apart, a rating of between 40 and 50 on the Durometer D scale, and have a bounce of 30-34 inches when dropped from 78 inches. Currently the Franklin X-40™ is the official pickleball ball of both USA Pickleball and the US Open.

These different factors can impact how long the pickleball ball dwells or sits on the surface of the pickleball paddle when struck, which is described in the art as a "trampoline effect". As the pickleball ball nestles into the surface it can then bounce off the surface. Hence, modifications to the pickleball ball should not increase or introduce the trampoline effect, and must also remain within the requirements for competitive play.

Over time, pickleball balls wear down due to impact, sun exposure, rough surfaces, and temperature, among other factors. A pickleball ball may, over time, become too soft for play, lose shape, and/or accumulate cracks resulting in loss of consistency in their flight. In particular, pickleball balls have been known to crack easier under low temperatures, greatly reducing their payable life.

The present inventors have developed modified pickleball balls that enhance durability of the ball while maintaining the required play characteristics. In some embodiments, the modification increases the number of hits a pickleball ball can handle before cracking, softening, or losing shape. This can improve the durability of the ball. In some embodiments, the modifications maintain the hardness of the pickleball ball over a longer period of time. In some embodiments, the modifications allow the pickleball ball to maintain its shape for a longer period of time. In some embodiments, the modifications allow the pickleball ball to withstand cracking for a longer time, or reduce the likelihood of cracking. In some embodiments, the modifications allow the pickleball ball to withstand environmental extremes or temperature extremes for a longer time, such as: uneven terrain, high temperatures, low temperatures, high sun exposure, high humidity, low humidity, and/or rapid changes in temperature.

The present inventors have also developed modified pickleball balls that control or minimize noise when playing, by reducing or modifying the sound generated when a ball strikes a pickleball paddle. In some embodiments, the modifications reduces the decibel sound or loudness of a ball striking a pickleball paddle. In some embodiments, the modifications eliminates the sound of a ball striking a pickleball paddle. In some embodiments, the modifications dampens the sound of a ball striking a pickleball paddle. In some embodiments, the modifications changes the sound of a ball striking a pickleball paddle. In some embodiments, the modifications change the frequency sound of a ball striking a pickleball paddle. In one embodiment, the frequency sound of a ball striking a pickleball paddle is reduced from about 1200 hz to 1000-500 hz, 800-500 hz, 800 hz or lower, 700 hz or lower, 600 hz or lower, about 500 hz, or about 400-500 hz. In one embodiment, modifications result in a sound decibel reduction of around 3-5 dB or about 25-40%, as perceived by the human ear.

The present inventors have also developed modified pickleball balls that improve the performance of the ball during play. In some embodiments, the modification increases the consistency of the ball during play. In some embodiment, the modification allows for predictable or consistent ball movement or rebound when the ball strikes a pickleball paddle. In some embodiments, the modification allows the ball to travel in a consistent arc through the air after being struck by a paddle. In some embodiments, the modification reduces variations in the arc path of the ball through the air due to wind turbulence.

In addition to providing the desired sound alterations, durability, and/or performance, the modifications described here do not alter performance, in order to avoid any play advantage. For example, the modifications described herein avoid introducing additional spin to the ball, or increase trampoline effect.

Graphene Infusion

In some embodiments, modifications are made to the pickleball ball to enhance durability while maintaining the same bounce properties. The present disclosure provides a pickleball ball that is manufactured from a graphene infused plastic. The infusion of graphene allows the pickleball ball to maintain the same bounce properties, while allowing for at least 1.5 times, at least twice as many, or about 2-3 times more hits before cracking or losing shape compared to a standard competition Franklin ball. The present inventors have also discovered that the additional durability offered by infusing graphene also renders the pickleball ball more tolerant to a variety of temperatures, including temperature extremes.

In some embodiments, a pickleball ball is made of graphene and a polymer, preferably a plastic. Graphene is an allotrope of carbon consisting of a single layer of atoms arranged in a hexagonal lattice nanostructure. Graphene has been known as the hardest or strongest material known to exist, being about 200 times stronger than steel while being lighter than paper. Graphene is a very useful nanomaterial due to its exceptionally high tensile strength, electrical conductivity, transparency, and being the thinnest two-dimensional material in the world. In some embodiments, the graphene is introduced to the polymer as a very fine powder. In some embodiments, the graphene powder is a white graphene powder. In one embodiment, the graphene powder is a graphene oxide powder.

In some embodiments, a pickleball ball is made of graphene infused polypropylene (PP). In some embodiments, a pickleball ball is made of graphene infused polyethylene (PE). In one embodiment, the polyethylene is a high density polyethylene (HDPE). In some embodiments, a pickleball ball is made of a graphene infused co-polymer of PE. In one embodiment, a pickleball ball is made of graphene infused PE and PP co-polymer. In one embodiment, the pickleball is made of graphene infused HDPE and PP co-polymer. In some embodiments, the ratio of HDPE to PP in the co-polymer is between 60/40 and 50/50 by weight. In one embodiments, the HDPE and PP co-copolymer is about equal part HDPE to PP. In one embodiment, the HDPE and PP co-copolymer is a 50/50 co-polymer by weight. In one embodiment, the HDPE and PP co-copolymer is a 55/45 co-polymer by weight.

In one embodiment, a noise controlled pickleball ball is made of graphene infused HDPE and PP co-polymer. In one embodiment, the co-polymer is a 50/50 HDPE/PP co-polymer. In one embodiment, the graphene infused HDPE/PP co-polymer pickleball comprises at least 0.001%, at least 0.01%, preferably 0.01%-0.05%, and more preferably about 0.02% graphene by weight. The present inventors have discovered that a pickleball ball having too high a graphene content not only becomes too heavy, but also results in weaker overall structure and a sticky surface which interferes with play as well as manufacturing. For example, this sticky texture becomes pronounced where the graphene content of a pickleball ball is greater than or equal to 0.04%. In one embodiment, the graphene infused pickleball ball comprises about 0.03% graphene.

In some embodiments, a pickleball ball is made of graphene infused low density polyethylene (LDPE). In one embodiment, the LDPE has a hardness value of about 40-50, or preferably about 45-48 based on the Shore D scale for plastics. In preferred embodiments, the LDPE has a hardness value of about above 50, or about 50-55 based on the Shore D scale. A hardness in these ranges signify a material that is relatively soft, such that the LDPE exhibits a desired balance of flexibility, toughness and durability. LDPE (Low-Density Polyethylene) can come in various grades and types, each with differences that make them more suitable for certain applications over others. The variations can be in terms of density, melt flow rate (MFR), molecular weight distribution, and levels of branching. Density: different grades of LDPE might have slightly different densities, affecting their rigidity and flexibility. Melt Flow Rate (MFR): MFR represents how easily the polymer flows during processing. Different applications might require LDPE with different MFRs depending on the processing technique used and the desired properties of the final product. Molecular Weight: the molecular weight and its distribution can influence properties like toughness, tensile strength, and impact strength. Branching: the degree of branching can affect density, and therefore, physical properties. More branching usually results in lower density and makes the polymer more flexible and resilient. Additives: LDPE can be modified with various additives to enhance certain properties like UV resistance, anti-static properties, or to alter color. Co-polymers: LDPE can be co-polymerized with other olefins to achieve different properties. For instance, LLDPE (Linear Low-Density Polyethylene) is co-polymerized with butene, hexene, or octene to achieve better tensile strength and puncture resistance than LDPE. Clarity: different grades might offer varying degrees of clarity/transparency, which might be a crucial factor for certain packaging applications. Processing Method: LDPE suited for different processing methods like blow molding, injection molding, or film extrusion may have different characteristics. End-use Application: depending on the end-use, LDPE can be customized, for example, to be more durable for heavy-duty sacks or to be safe for food contact applications.

Turning to FIGS. 1-7, an exemplary durability enhanced pickleball ball is provided. In one embodiment, the durability enhanced pickleball ball is made of graphene infused LDPE. In one embodiment, the graphene infused LDPE has a Shore D hardness value of about 50-55. In one embodiment, the graphene infused LDPE pickleball ball comprises at least 0.001%, at least 0.01%, preferably 0.01%-0.05%, or more preferably about 0.02% graphene by weight. In one embodiment, the graphene infused pickleball ball comprises about 0.03% graphene. In one embodiment, the durability enhanced pickleball ball is made of graphene infused HDPE and PP co-polymer. In one embodiment, the co-polymer is a 50/50 HDPE/PP co-polymer. In one embodiment, the graphene infused HDPE/PP co-polymer pickleball ball comprises at least 0.001%, at least 0.01%, preferably 0.01%-0.05%, or more preferably about 0.02% graphene by weight. In one embodiment, the graphene infused pickleball comprises about 0.03% graphene. To provide better visual detection, the durability enhanced pickleball ball is provided in a neon green color, such as Pantone 802.

Exemplary durability enhanced pickleball balls comprising graphene infused LDPE were tested for durability using striking tests. The strike speed of each ball was 3000 revolutions, the test speed is 115 km/h, and the test force is 2.6 KG. 10 balls were struck 800 times each, and then struck again for 800 times each. In total, each of the 10 balls has been struck 1600 strike times (16000 strike tests in total), and there is no obvious deformation or cracking on the spherical appearance of the balls. Each ball also underwent impact testing at a rotation speed of 3000 RPM, a test speed of 115 km/h, and an impact force of 2.6 KG. 10 balls were each tested 800 times, and again for an additional 800 times each. In total, 10 balls have completed 1600 impacts each (ie, 16000 impact tests in total). The appearance of the balls shows no significant deformation or cracking.

Exemplary durability enhanced pickleball balls comprising graphene infused LDPE were also subjected to bounce tests. 20 balls, each 26 g in weight and having diameter of 74-75 mm, were used. Each ball had a Shore D hardness of 51-55 as measured from three points (at the cut surface, cross section and the middle position of the die) using Shaw hardness tester A-2132 model. The 20 balls were dropped vertically from a height of 190 CM onto a granite plate and the bounces video captured. The ball bounced back to a bounce altitude of 75-90 cm. Further strike tests of 4200 strikes per ball was conducted on 14 balls. The strike test speed was 3000 rpm for each ball, the test speed was 115 km/h, the test force was 2.6 KG. The ball did not crack, but slightly deformed.

Exemplary durability enhanced pickleball balls comprising graphene infused HDPE and PP co-polymer were subjected to bounce tests. 41 balls, each 25-26 g in weight and having diameter of 73-74 mm, were used. Each ball had a Shore D hardness of 46-50 as measured from three points (the vertical section, cross section and the middle position of the die) using Shaw hardness tester A-2132 model. The 20 balls were dropped vertically from a height of 190 CM onto a granite plate and the bounces video captured. The ball bounced back to a bounce altitude of 75-85 cm.

As control, similar tests were conducted on ten Dura 40™ pickleball balls and ten Franklin™ pickleball balls. The rotation speed of each ball in the striking test is 3000 revolutions, the test speed is 115 kilometers per hour, and the test force is 2.6 KG. After the 20 balls were struck 600 times each, they were struck again for 200 times each. In total, each of the 20 balls has been struck 800 times (16000 strike tests in total). The balls deformed slightly losing their spherical appearance but there was no cracking. The Franklin™ control balls had a Shore D hardness value of 47-52. The Dura 40™ control balls ad a Shore D hardness value of 51-56. Bounce tests conducted on 27 Franklin™ control balls yielded a bounce altitude of 78-83 cm. Bounce tests conducted on 28 Dura 40™ control balls yielded a bounce altitude of 81-86 cm.

In some embodiments, modified pickleball balls are provided in colors having higher sensitivity for the human eye. In some embodiments, modified pickleball balls are provided in neon colors. In some embodiment, the modified pickleball balls are provided in colors where the color pigments do not alter play characteristics of the ball. The present inventors have discovered that certain pigment compounds when incorporated into a pickleball ball can impact ball performance. In one embodiment, modified pickleball balls are provided in neon green (such as Pantone 802) or neon orange color. In one embodiment, modified pickleball balls are provided in dark yellow or honey yellow color.

Hole Configuration

The present inventors have discovered that the size of the holes in a pickleball ball play a role in the resulting sound of play. In particular, larger holes have been determined to dramatically reduce the sound generated when a pickleball ball strikes a pickleball paddle. However, standard pickleball balls are made of materials that do not provide the necessary structure for larger holes, resulting in cracks or loss of shape after only a few hits. As such, the present disclosure also provides an improved ball with graphene in some embodiments to improve the durability of the ball.

In some embodiments, a pickleball ball provided herein has holes with a larger diameter than standard pickleball balls (i.e., Franklin ball). The present inventors have discovered that larger holes also reduced noise. In one embodiment, all the holes have a larger diameter. In one embodiment, some of the holes have a larger diameter. In one embodiment, at least one hole has a larger diameter. In some embodiments, the holes are 5-8 mm in diameter. In one embodiment, the holes are 5.5-6.5 mm in diameter.

The present inventors have discovered that the shape and arrangement or placement of the holes impact the sound generated by the pickleball ball, durability, and/or performance. In particular, pickleball balls with a highly symmetrical arrangement of holes, such as at least 80%, at least 90%, and/or at least 95% symmetry exhibit reduced sound, increased durability, and/or improved performance. As used herein, "symmetry" of pickleball balls refers to balls having an arrangement of holes where the distances between the holes are more or less of equal distance apart from each other.

Embodiments described herein provide a ball with a spherical shape. The ball has a spherical shell or layer defining a hollow cavity. The shell or layer (e.g. providing the hollow cavity of the ball) defines a plurality of holes in distributed around the surface of the ball. The spherical layer defines the holes and distributes that holes over the surface of the ball in an arrangement such that the holes are equally (or about equally or approximately equally in view of a threshold variation) distributed across the surface of the ball. That is, the shell defines holes that are equally distributed such that there is an equal distance (or about equal or approximately equal in view of a threshold variation) between adjacent or neighboring holes. There may be a threshold variation of distance between the holes so that they close to equal distance with some minor variation in distance between the holes being acceptable. In an aspect, embodiments described herein provide a ball with a spherical shell or layer defines holes that are of equal size and shape (or about equal or approximately equal in view of a threshold variation). In another aspect, the ball is made of a graphene-infused polymer material. Embodiments described herein provide a hollow ball comprising a spherical shell defining a hollow cavity. The shell defines a plurality of holes distributed around the surface of the ball. The shell defines the holes into the hollow cavity.

The spherical shell separates the interior spherical space from the exterior environment. The shell can define the interior space as a hollow cavity. The shell or layer has holes that connect the interior spherical space to the exterior environment. That is, the shell defines holes that pass into the hollow cavity of the ball. In some embodiments, the spherical shell comprises a layer of material with generally even thickness. The spherical shell is a region between two concentric spheres of differing radii. The shell region of the ball can have generally even thickness. Holes distributed on the surface of a ball extends through the spherical shell connecting the interior spherical space to the exterior environment.

In some embodiments, there is provided a pickleball ball with the holes distributed in a pattern or arrangement on the surface of the pickleball ball so that the holes are (about or approximately) equally spaced and symmetrical arranged. Symmetric can refer to an equal distance between each pair of holes. The holes are distributed over the entire surface of the ball in the symmetric arrangement. In some embodiments, a pickleball ball has holes distributed in a spherical pattern where the distances between each pair of adjacent holes are equal. In some embodiments, a pickleball ball has holes distributed in a spherical pattern where the distances between each pair of adjacent holes are about equal within a tolerance threshold or range of difference. In some embodiments, a pickleball ball has holes distributed in a spherical pattern where the radial angle between each pair of adjacent holes are equal. In some embodiments, a pickleball ball has holes distributed in a spherical pattern where the radial angle between each pair of adjacent holes are equal within a tolerance threshold or range of difference. In some embodiments, a pickleball ball has holes distributed in a spherically repeating pattern where the distances between each pair of adjacent holes are equal. In some embodiments, a pickleball ball has holes distributed in a spherically repeating pattern where the distances between each pair of adjacent holes are about equal within a tolerance threshold or range of difference. In some embodiments, a pickleball ball has holes distributed in a regular pattern where the distances between each pair of adjacent holes are equal. In some embodiments, a pickleball ball has holes distributed in a regular pattern where the distances between each pair of adjacent holes are about equal within a tolerance threshold or range of difference. In some embodiments, a pickleball ball has holes distributed in an even manner where the distances between each pair of adjacent holes are equal. In some embodiments, a pickleball ball has holes distributed in an even manner where the distances between each pair of adjacent holes are about equal within a tolerance threshold or range of difference. In some embodiments, a pickleball ball has holes equally distributed on its spherical surface where the distances between each pair of adjacent holes are equal. In some embodiments, a pickleball ball has holes equally distributed on its spherical surface where the distances between each pair of adjacent holes are about equal within a tolerance threshold or range of difference.

A ball with a symmetrical and/or even distribution of holes allows for more efficient distribution of kinetic energy, and more predictable and consistent play. In some embodiments, the holes are circular. In other embodiments the holes are non-circular. In some embodiments, the holes all exhibit the same shape and size. Typically, pickleball balls have about 26-40 holes. Professional pickleball associations also require balls to have 26-40 holes. For each particular number of holes, a pickleball ball will have a different hole pattern so that the holes are evenly distributed. In one embodiment, a ball with a 32 hole pattern is provided. In another embodiment, a ball with a 40 hole pattern is provided.

Figure 8:
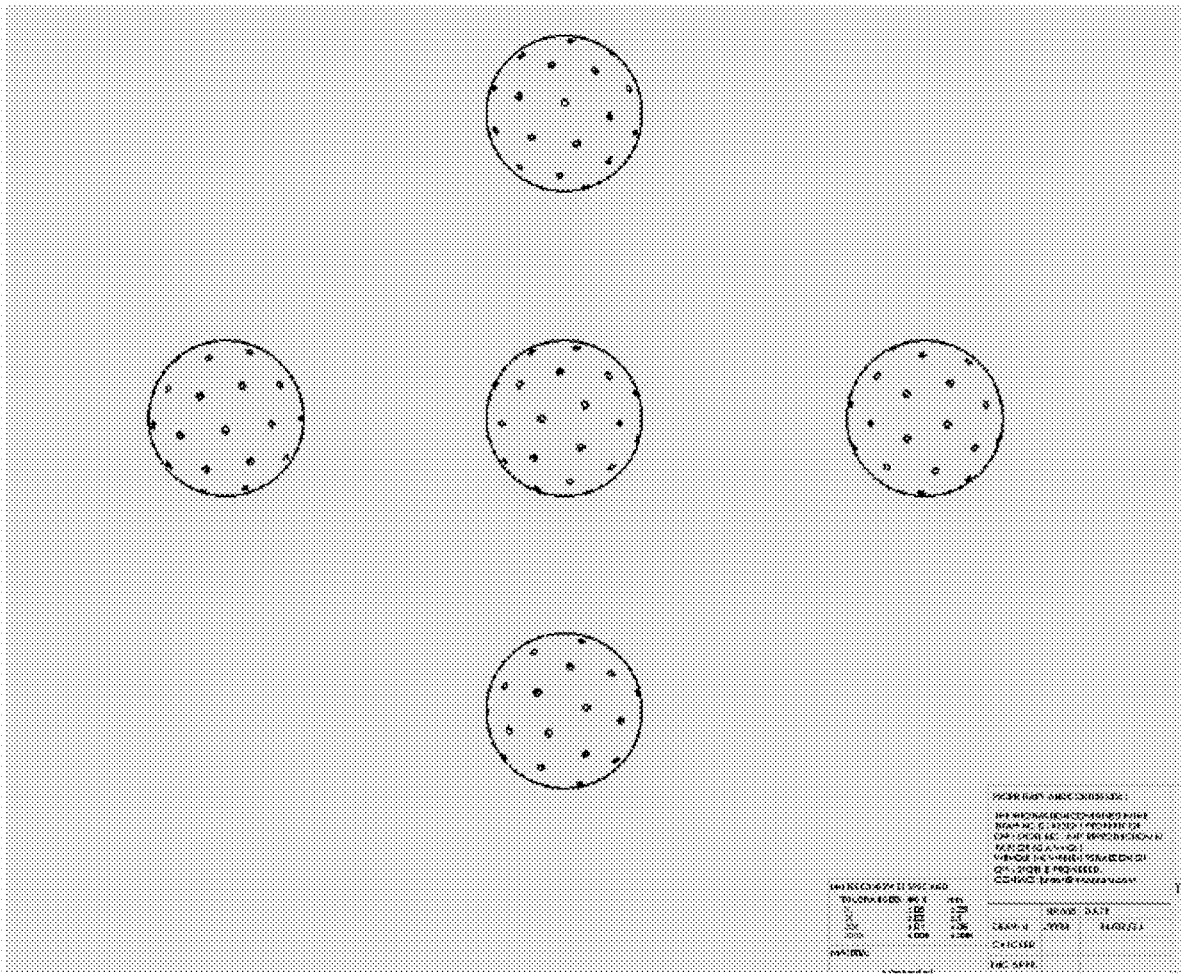
FIG. 8 shows a pickleball ball having a 40-hole pattern in multiple views. Middle—front view; top—top view; left—left view; right—right view; bottom—bottom view.

The present inventors have discovered useful applications for an arrangement of points on a sphere. See, Peake et al. ("The equal spacing of N points on a sphere with application to partition-of-unity wave diffraction problems", Durham University, School of Engineering and Computing Sciences) for a description of an example process for spacing points on a sphere, the entire content of which is hereby incorporated by reference herein. Starting with a target number of holes, a pattern or arrangement is determined based on equal spacing and applied to a pickleball ball. In one embodiment, a performance enhanced pickleball ball has a 32-hole pattern. In one embodiment, a performance enhanced pickleball ball having a 40-hole pattern is shown in FIG. 8. The 32 hole pattern has a hole distribution error of around 2.7 mm, where the distance between any two adjacent holes vary by around 2.7 mm. The 40-hole pattern has a hole distribution error of around 4 mm, where the distance between any two adjacent holes vary by around 4 mm. In some embodiments, for each number of holes in a pattern, a particular tolerance threshold of variance is provided based on and varies depending on the number of holes.

Existing hole patterns include the Tru 32™ from Wilson Sporting Goods and the ball from Joola Heleus. The Tru 32™ is a 32-hole ball and the hole spacing is driven by a simple geometric pattern of where there are two polar holes and four sets of holes arranged in a staggered ring between the two polar holes. The Tru 32™ has a hole distribution error of around 5 mm, where the distance between any two adjacent holes vary by around 5 mm. The Joola Heleus ball is a 40-hole ball that uses the Fibonacci algorithm to create a spiral arrangement of holes. The Joola Heleus ball has a hole distribution error of around 8 mm, where the distance between any two adjacent holes vary by around 8 mm. Neither the Tru 32™ or the Joola Heleus pickleball balls contain any graphene. The 32-hole pattern pickleball according to the present disclosure exhibited 50% improved performance compared to Tru 32™, while the 40-hole pattern pickleball according to the present disclosure exhibited 20% improved performance compared to the Joola Heleus ball.

Manufacturing Modified Pickleball

Embodiments described herein provide a method for making a ball with a symmetrical arrangement of holes. The method involves generating a hole pattern for a layer of the ball with evenly spaced holes, and making a plurality of holes arranged symmetrically on its spherical shell or surface according to the hole pattern. In some embodiments, the method involves preparing a formula for the ball of a blend of polymers and graphene, and/or providing a colour for the ball with sensitivity for human eye. The method can use a process for defining a resting place for points on the ball's surface with equal distance (or about equal distance).

The process can involve determining a total number of holes for the ball and calculating the hole pattern. For example, a ball can have 40 holes symmetrically arranged over its surface with the shell of the ball defining the holes. As another example, a ball can have 32 holes symmetrically arranged over its surface with the shell of the ball defining the holes. The hole pattern can vary depending on the total number of holes for the ball given that each hole will be about equal distance from the other adjacent holes on the ball. In some embodiments, the distance between holes may be approximate or about equal distance within a tolerance threshold or range of difference.

The modified pickleball balls described herein are manufactured by injection molding, rotocasting or rotomolding, or 3D printing. In preferred embodiments, the modified pickleball balls described herein are manufactured by rotocasting or rotomolding. Compared to injection molding, rotocasting has the advantage of manufacturing the spherical ball casted in one piece. In the case of injection molding, two hemispheres of the ball are separately molded and then subsequently joined. This creates a point of weakness where the two hemispheres are joined. In one embodiment, a noise controlled ball is manufactured by injection molding.

What is claimed is:

1. A pickleball ball for increasing durability, improving performance, or reducing the loudness or frequency of sound generated when said ball strikes a paddle, the ball being a hollow ball comprising a spherical shell defining a hollow cavity, the ball made of a graphene-infused polymer material and the shell defining a plurality of holes distributed around the surface of the ball, the graphene-infused polymer material is a graphene-infused co-polymer comprising 50/50 high density polyethylene (HDPE) and polypropylene (PP) by weight and less than 0.05% by weight graphene.

2. The pickleball ball of claim 1, wherein the co-polymer has a Shore D hardness value of 50-55.

3. The pickleball of claim 2, comprising 0.001%-0.05% by weight graphene and the rest plastic.

4. The pickleball ball of claim 3, comprising 0.01%-0.05% by weight graphene and the rest plastic.

5. The pickleball ball of claim 3, comprising 0.02% by weight graphene and the rest plastic.

6. The pickleball ball of claim 3, comprising 0.03% by weight graphene and the rest plastic.

7. The pickleball ball of claim 3, wherein the graphene is white graphene oxide powder.

8. The pickleball ball of claim 1 wherein the shell defines the plurality of holes distributed in a pattern, and wherein the patterns yields equally spaced holes.

9. The pickleball ball of claim 8, wherein the shell defines 32 or 40 holes.

10. The pickleball ball of claim 1 wherein the shell defines the plurality of holes arranged symmetrically on its surface.

11. The pickleball ball of claim 1, having a color with sensitivity for human eye.

12. The pickleball ball of claim 11, having a neon green color, a neon orange color, a dark yellow color, or a vibrant fluorescent green color.

13. The pickleball ball of claim 1, wherein the holes have the same size and shape.

* * * * *